Patented Apr. 12, 1938

2,113,807

UNITED STATES PATENT OFFICE 2,113,807

PRODUCTION OF SULPHUR-CONTAINING DERIVATIVES OF HIGHER FATTY ALCOHOLS

Richard Hueter, Rosslau-Anhalt, Germany, assignor to Deutsche Hydrierwerke Aktiengesellschaft, Berlin-Charlottenburg, Germany, a corporation of Germany No Drawing. Application September 29, 1934, Serial No. 746,142. In Germany September 30, 1933

14 Claims. (Cl. 260—99.12)

This invention relates to new condensation products. More particularly it relates to the condensation of unsaturated high molecular weight alcohols and their derivatives with mercaptans. Still more particularly it relates to the condensation of unsaturated high molecular weight normal alcohols and their derivatives with substituted mercaptans and to the products so produced.

It is an object of the present invention to produce new condensation products. A further object is to condense unsaturated high molecular weight alcohols with mercaptans. A still further object is to produce new thio-ethers. A still further object is to condense unsaturated high molecular weight alcohols and their esters with substituted mercaptans, especially those containing acidic substituents. Other objects will appear hereinafter.

These objects are accomplished by bringing together a mercaptan and an unsaturated alcohol containing more than seven carbon atoms. In the preferred form of the invention the alcohol is unsaturated and the mercaptan contains an acidic substituent, e. g., for example, a carboxyl or a sulphonic acid group.

The following examples are given by way of illustration only and are not to be construed as limiting the scope of the invention.

Example 1

Oleyl alcohol and thioglycollic acid are mixed in approximately molal proportions and allowed to stand at room temperature. When reaction is complete the product may be treated with caustic soda to produce a good soap.

Example 2

Oleyl acetate is substituted for the oleyl alcohol in Example 1 to give a product having good soap properties also.

Example 3

The product produced by bringing together approximately molal quantities of oleyl alcohol and thioglycollic acid at room temperature is sulphonated after reaction is complete with strong sulphuric acid at approximately room temperature, after which the resulting product is neutralized with caustic soda. The product has good soap-like properties and in addition superior capillary-activity.

Example 4

Oleyl acetate is used in place of oleyl alcohol in the process of Example 3. In this process, however, the product is advisably hydrolyzed before the addition of the sulphuric acid is carried out.

The starting materials which may be used in the process of this invention are not limited to those mentioned above. In place of the oleyl alcohol in the above examples any unsaturated alcohol or ester of an unsaturated alcohol containing more than seven carbon atoms may be used. These will include aliphatic alcohols, which may be primary, secondary, tertiary, mono- or polyhydroxy, straight chain, branched chain or substituted, as well as alicyclic alcohols and aryl substituted alcohols. Examples of such alcohols are, oleyl, ricinoleyl, linoleyl, octadecenyl, alcohols obtained by hydrogenating naphthenic acids, and in general alcohols obtained by hydrogenating unsaturated fatty acids or waxes. These alcohols may be used alone or in mixtures, in the proportions in which long-chain acids naturally occur or otherwise.

Esters of these unsaturated alcohols may likewise be used in place of the oleyl alcohol or oleyl acetate. Esters of these unsaturated alcohols which may be mentioned are the fatty acid esters, such as the acetates, propionates, butyrates, etc.

In the preferred form of the invention an unsaturated fatty alcohol containing from 8 to 18 and better yet, from 12 to 18 carbon atoms is used. This alcohol may or may not be esterified with a lower fatty acid prior to treatment, as desired.

As the material to be reacted with the alcohol or ester any mercaptan may be used. In general compounds of the formula "RSH" in which "R" is an organic radical will react with the alcohols described above. "R" may be aliphatic aromatic or alicyclic and may contain a wide variety of substituents. Thioglycollic acid has been mentioned. To this may be added the thio derivatives of any of the alcohols mentioned above, as well as the alcohols of lower molecular weight. Examples of these mercaptans are methyl, ethyl, propyl, butyl, amyl, etc. and acidic derivatives of these as well as other mercaptans.

In the preferred form of this invention substituted mercaptans are used, particularly those containing substituents which add to their water solubility, i. e., those containing carboxyl groups, sulphonic acid groups, etc.

Thiol ethers of the general formula

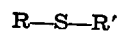

in which "R" is a high molecular weight radical and "R'" is a hydrocarbon or substituted hydrocarbon radical are produced by the present process. Other products are also produced and may be separated by well known means.

The condensation or addition products obtained as described above may be subjected to further treatment. Preferably they are either neutralized with an alkali or alkaline reacting material, for example, caustic soda or caustic potash or they may be first treated with an acid such as sulphuric, phosphoric, boric or acetic or two or more of these and then neutralized. Other modifications include blocking the hydroxyl group in unsaturated alcohols prior to condensation with, or addition of, the mercaptan and hydrolyzing the products obtained by condensing unsaturated esters, prior to reacting them with sulphuric acid, or other agents of acidic character such as phosphoric, boric or acetic acid.

The condensation reaction is ordinarily carried out at room temperature but the invention is not so limited. The use of heat and cooling are contemplated. The same may also be said with respect to the further treatment of these products, such as neutralization, sulphation or sulphonation, etc.

The proportions of the reactants to be used may also be varied as desired and by such variation a variety of products may be obtained. Regard is to be had to the nature of the specific reaction to be carried out, when the proportions of reactants are being determined. The examples specify equimolal proportions for the condensation or addition reaction but a rather wide variation from these amounts is contemplated. If the products of the condensation are to be treated with, for example, sulphuric acid, the amount of acid may be determined from the use to which the treated products are to be put.

A preferred group of mercaptans are those having the following general formula $$HS-R-X$$

in which "R" is a hydrocarbon radical and "X" is a solubilizing group. Particularly valuable agents having soap-like properties are obtained by condensing them with unsaturated esters as described above, then hydrolyzing the product so obtained and treating it with strong sulphuric acid at normal temperatures. The sulphuric acid reaction product is then neutralized with alkali, for example, caustic soda. Another specific mercaptan which may be mentioned is mercapto-benzo-thiazole.

These new products, especially those which have been reacted with sulphuric acid are useful, particularly as wetting-out, washing and emulsifying agents, in many different technical processes, such as the treatment for processing and improvement of textile materials, namely: cleaning vegetable and animal fibres, particularly when removing fatty or oily materials, carbonization, as an addition to flax retting baths, in fulling, sizing, and as an addition when the sizing material is removed from the textile, in impregnating, bleaching, mordanting, as an addition to soap in an acid bath, in mercerizing lye treating solutions, to improve the absorption capacities of fibrous materials, in lustering and delustering processes, in degumming, kier-boiling, scouring, stripping, felting and oiling or lubricating of yarns, as well as, weighting or loading of textile fibres. These materials are also of particular value in dyeing in neutral, acid or alkaline baths, for reserving cotton in acid baths, in dyeing with developed or diazotized dyes, the dyeing of animal fibres with vat dyes, the dyeing of cellulose acetate fibres with insoluble dyes, and the dyeing or printing with aniline black. They may be used for making paste of dyes or dye components, for the production of azo, basic, acid, vat or sulphur dyes in a finely divided condition, and the production of finely divided inorganic pigments. They are useful for the conversion of solid substances normally insoluble in water, such as hydrocarbons, higher alcohols and other oxygen containing compounds, fats, oils, waxes, resins, pitches and pitchy substances into clear solutions or emulsions or dispersions, as cleansing agents particularly in hard water and where a fatty or oily film resists the usual cleansing media, in softening the baths for hides and skins and in froth flotation processes for the separation of the mineral constituents.

It is apparent that many widely different embodiments of this invention may be made without departing from the spirit and scope thereof, therefore, it is not intended to be limited except as indicated in the appended claims.

I claim:
1. A process which comprises reacting an unsaturated alcohol containing at least 8 carbon atoms with a mercaptan.
2. A process which comprises reacting an unsaturated aliphatic alcohol containing at least 8 carbon atoms with a thio-organic acid.
3. The process defined in claim 2 wherein the unsaturated alcohol is a normal primary alcohol and wherein the thio-organic acid is of carboxylic or sulphonic acid character.
4. A process which comprises esterifying an unsaturated aliphatic normal primary alcohol containing at least 8 carbon atoms with a lower fatty acid, and reacting the resulting ester with a mercaptan containing a carboxylic or sulphonic acid group.
5. The process of claim 4 wherein the product is hydrolyzed to split off the ester group.
6. The process of claim 4 wherein the product is hydrolyzed to split off the ester group, and the resulting alcohol is treated with a mineral acid and neutralized.
7. The process of claim 4 wherein the product is hydrolyzed to split off the ester group, and the resulting alcohol is treated with a sulphonating agent and neutralized to form a water soluble salt.
8. A process which comprises esterifying oleyl alcohol with a lower fatty acid, and reacting the resulting ester with a mercaptan containing a carboxylic or sulphonic acid group.
9. The process of claim 8 wherein the product is hydrolyzed to split off the ester group, and the resulting alcohol is treated with a mineral acid and neutralized.
10. A process which comprises reacting oleyl acetate with thio-glycollic acid, hydrolyzing the product to split off the acetate group, treating the resulting alcohol with a sulphonate to form a sulphuric acid ester, and neutralizing with caustic soda.
11. A sulphur-containing compound having the following formula:

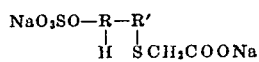

wherein R—R' represents the hydrocarbon radical of oleyl alcohol.

12. A process which comprises reacting a member selected from the group consisting of unsaturated normal primary aliphatic alcohols containing at least eight carbon atoms and their lower fatty acid esters with a mercaptan containing an acidic group selected from the class consisting of a carboxylic group and a sulphonic acid group.

13. A process which comprises reacting an unsaturated aliphatic alcohol containing at least 8 carbon atoms with a mercapto-organic acid, and subsequently treating the product with a mineral acid and neutralizing.

14. A process which comprises reacting an unsaturated normal primary aliphatic alcohol containing at least eight carbon atoms with a mercaptan containing an acidic group selected from the class consisting of a carboxylic group and a sulphonic acid group, and subsequently treating the product first with a sulphonating agent and then with a neutralizing agent.

RICHARD HUETER.

CERTIFICATE OF CORRECTION.

Patent No. 2,113,807.  April 12, 1938.

RICHARD HUETER.

It is hereby certified that error appears in the printed specification of the above numbered patent requiring correction as follows: Page 2, second column, line 65, for the word "sulphonate" read sulphonating agent; and that the said Letters Patent should be read with this correction therein that the same may conform to the record of the case in the Patent Office.

Signed and sealed this 26th day of July, A. D. 1938.

(Seal)

Henry Van Arsdale,
Acting Commissioner of Patents.